(12) United States Patent
Lukiyan et al.

(10) Patent No.: US 11,546,367 B2
(45) Date of Patent: Jan. 3, 2023

(54) SYSTEMS AND METHODS FOR PROTECTING AUTOMATED SYSTEMS USING A GATEWAY

(71) Applicant: AO KASPERSKY LAB, Moscow (RU)

(72) Inventors: Dmitry S. Lukiyan, Moscow (RU); Alexey G. Vereshchagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 143 days.

(21) Appl. No.: 16/663,962

(22) Filed: Oct. 25, 2019

(65) Prior Publication Data
US 2020/0259856 A1    Aug. 13, 2020

(30) Foreign Application Priority Data

Feb. 7, 2019    (RU) .......................... RU2019103367

(51) Int. Cl.
*H04L 9/40* (2022.01)
*G06F 9/54* (2006.01)
*H04L 45/02* (2022.01)

(52) U.S. Cl.
CPC .......... *H04L 63/1433* (2013.01); *G06F 9/541* (2013.01); *H04L 45/02* (2013.01); *H04L 63/20* (2013.01)

(58) Field of Classification Search
CPC .................................. H04L 63/1433
USPC .......................... 726/25; 709/200
See application file for complete search history.

(56) References Cited

U.S. PATENT DOCUMENTS

| 6,983,449 | B2 | 1/2006 | Newman |
| 7,315,826 | B1 | 1/2008 | Guheen et al. |
| 7,346,922 | B2* | 3/2008 | Miliefsky ........... H04L 63/0272 726/4 |
| 7,644,432 | B2* | 1/2010 | Patrick .................... H04L 63/20 717/172 |
| 7,675,867 | B1 | 3/2010 | Mraz et al. |
| 7,774,402 | B2 | 8/2010 | Singh et al. |
| 7,849,495 | B1 | 12/2010 | Huang et al. |
| 7,941,784 | B2 | 5/2011 | Shenfield et al. |

(Continued)

FOREIGN PATENT DOCUMENTS

| EP | 2660667 | 11/2013 |
| GB | 2538952 | 12/2016 |

(Continued)

OTHER PUBLICATIONS

Application and File History for U.S. Appl. No. 16/664,032, filed Oct. 25, 2019, inventors Lukiyan et al.

(Continued)

*Primary Examiner* — Anthony Mejia
(74) *Attorney, Agent, or Firm* — Patterson Thuente, P.A.

(57) ABSTRACT

Systems and methods for protecting an automated system (AS) including building a security configuration based on architecture data of the AS such that compliance with the security configuration ensures a security level for AS devices, installing a data transmission application on a gateway of an AS network using the security configuration, and transmitting data from one of the AS devices through the data transmission application such that the actions of the data transmission application are defined by the security configuration.

20 Claims, 5 Drawing Sheets

(56) References Cited

U.S. PATENT DOCUMENTS

| | | | |
|---|---|---|---|
| 7,970,830 B2 | 6/2011 | Staggs et al. | |
| 8,209,400 B2 | 6/2012 | Baum et al. | |
| 8,397,286 B2 | 3/2013 | Declety et al. | |
| 8,612,612 B1* | 12/2013 | Dukes | H04L 67/141 |
| | | | 709/203 |
| 8,719,898 B1* | 5/2014 | Barton | G06F 3/0481 |
| | | | 726/1 |
| 8,806,570 B2 | 8/2014 | Barton et al. | |
| 8,996,584 B2* | 3/2015 | Sharma | G16H 10/60 |
| | | | 707/798 |
| 9,094,473 B2 | 7/2015 | Kundgol et al. | |
| 9,692,748 B2 | 6/2017 | Maheshwari et al. | |
| 9,692,791 B1* | 6/2017 | Mishra | H04L 63/1425 |
| 9,716,617 B1* | 7/2017 | Ahuja | H04L 67/1001 |
| 9,778,640 B2 | 10/2017 | Salter et al. | |
| 9,781,153 B2 | 10/2017 | Pate | |
| 9,961,154 B1* | 5/2018 | Kemp | H04L 67/56 |
| 10,158,662 B1* | 12/2018 | Salehpour | G06F 21/70 |
| 10,178,177 B2 | 1/2019 | McLaughlin et al. | |
| 10,187,494 B2 | 1/2019 | Stewart et al. | |
| 10,270,745 B2 | 4/2019 | Rotvoid et al. | |
| 10,552,442 B1* | 2/2020 | Lusk | H04L 63/0884 |
| 10,572,315 B1* | 2/2020 | Lusk | G06F 9/541 |
| 2003/0014521 A1 | 1/2003 | Elson et al. | |
| 2003/0037327 A1 | 2/2003 | Cicciarelli et al. | |
| 2006/0067209 A1 | 3/2006 | Sheehan et al. | |
| 2008/0016313 A1 | 1/2008 | Murotake et al. | |
| 2008/0131255 A1* | 6/2008 | Hessler | B65B 35/50 |
| | | | 901/14 |
| 2009/0086692 A1 | 4/2009 | Chen | |
| 2010/0202450 A1 | 8/2010 | Ansari et al. | |
| 2010/0299742 A1 | 11/2010 | Tanaka et al. | |
| 2011/0296026 A1* | 12/2011 | Meier | G06F 9/544 |
| | | | 709/226 |
| 2012/0110571 A1 | 5/2012 | Smith et al. | |
| 2012/0291129 A1* | 11/2012 | Shulman | H04L 63/145 |
| | | | 726/23 |
| 2014/0108649 A1* | 4/2014 | Barton | G06F 9/45533 |
| | | | 709/224 |
| 2014/0109072 A1 | 4/2014 | Lang et al. | |
| 2015/0169867 A1* | 6/2015 | Scaife | G06F 21/564 |
| | | | 726/4 |
| 2016/0014078 A1* | 1/2016 | Schrecker | H04L 63/20 |
| | | | 726/12 |
| 2017/0005983 A1* | 1/2017 | Doukhvalov | G06F 21/6281 |
| 2017/0034023 A1* | 2/2017 | Nickolov | H04L 43/0817 |
| 2017/0070507 A1 | 3/2017 | Leconte et al. | |
| 2017/0223110 A1 | 8/2017 | Lawson et al. | |
| 2017/0339190 A1* | 11/2017 | Epstein | H04L 63/1433 |
| 2018/0115516 A1 | 4/2018 | Rotvoid et al. | |
| 2018/0323993 A1 | 11/2018 | Ansari et al. | |
| 2019/0089747 A1* | 3/2019 | Wang | H04L 63/1441 |
| 2020/0396259 A1* | 12/2020 | Schory | H04L 63/205 |
| 2021/0029026 A1* | 1/2021 | Deshmukh | H04L 45/34 |

FOREIGN PATENT DOCUMENTS

| | | |
|---|---|---|
| GB | 2558055 | 7/2018 |
| RU | 2679179 | 2/2019 |
| WO | WO2014094982 | 6/2014 |

OTHER PUBLICATIONS

European Search Report for European Application No. 19212841.1 dated Jan. 16, 2020.
Weis et al., "Towards Secure and Reliable Firewall Systems based on Minix 3", Aug. 8, 2017. XP055655648.
Russian Search Report for Russian Application No. 2019103367/08 dated Feb. 7, 2019.
Masood et al., "Efficiently Managing Security Concerns in Component Based System Design", Proceedings of the 29th Annual International Computer Software and Applications Conference. (2005).
European Communication for European Application No. 19214375.8 dated Apr. 29, 2021.

* cited by examiner

SYSTEMS AND METHODS FOR PROTECTING AUTOMATED SYSTEMS USING A GATEWAY

CROSS-REFERENCE TO RELATED APPLICATIONS

This Applications claims the benefit of Russian Federation Patent Application No. RU2019103367, filed Feb. 7, 2019, which is fully incorporated by reference herein. This application is also related to co-pending application Ser. No. 16/664,032, entitled "SYSTEMS AND METHODS FOR CONFIGURING A GATEWAY FOR PROTECTION OF AUTOMATED SYSTEMS," which is also fully incorporated by reference herein.

TECHNICAL FIELD

Embodiments relate generally to the field of automated systems, and, more specifically, to protecting automated systems.

BACKGROUND

In today's world, more and more electronic devices are connected to networks in order to be remotely controlled or monitored. Such devices are often included in automated systems (AS), and can be varied, for example, from home humidity sensors to high-technology machines.

Just as any other network, an AS network connecting various devices is vulnerable to offender attacks. Examples of such attacks can include gaining control over AS devices, for example, actuators (machine drives), or gaining unlawful access to data involving technical processes occurring in the AS. A method for protecting an AS network includes creating a private network accessible only from devices located within the physical limits of a certain area. However, a complete restriction of an AS network in this manner is not the most practical solution, especially when it is necessary to have remote access to data streams being formed by AS devices.

An alternative solution to the challenge of protecting devices in an AS network is to use a gateway, which functions as a "data diode", i.e. would let data move in only one direction—from AS devices to a network segment outside the gateway, but not back. UK Patent Application Pub. No. 2558055A describes, for example, an implementation of such a "diode" using multiple gateways, one of which is a border gateway for the AS network, while the other can only send data to the first one but cannot receive data from it. This implementation of a "data diode" has a deficiency due to the complexity of configuring such a network if any changes are made to the security configuration (a set of requirements which, when complied with, will ensure the required security level for AS devices). Therefore, there is a need for AS network security that both protects AS devices and allows for easily set up AS device access rules and security configurations.

SUMMARY

Embodiments described herein substantially meet the aforementioned needs of the industry. In particular, embodiments overcome the existing drawbacks of the known approaches to AS network protection and ensure the security of AS devices.

In an embodiment, a method for protecting an automated system (AS), the AS including a plurality of AS devices, comprises building a security configuration based on architecture data of the AS, wherein compliance with the security configuration ensures a security level for the plurality of AS devices; installing a data transmission application on a gateway of an AS network using the security configuration, the data transmission application configured to exchange data with at least one computing device outside the AS network; and transmitting data from one of the plurality of AS devices through the data transmission application, wherein the actions of the data transmission application are defined by the security configuration.

In an embodiment, a system for protecting an automated system (AS), the AS including a plurality of AS devices, comprises a control tool including a control tool computing platform including control tool computing hardware of at least one control tool processor and control tool memory operably coupled to the at least one control tool processor; instructions that, when executed on the control tool computing platform, cause the control tool computing platform to: build a security configuration based on architecture data of the AS, wherein compliance with the security configuration ensures a security level for the plurality of AS devices; a gateway including a control service configured to install a data transmission application on the gateway using the security configuration, the data transmission application configured to exchange data with at least one computing device outside an AS network, wherein the actions of the data transmission application are defined by the security configuration.

In an embodiment, a system for protecting an automated system (AS), the AS including a plurality of AS devices, comprises means for building a security configuration based on architecture data of the AS, wherein compliance with the security configuration ensures a security level for the plurality of AS devices; means for installing a data transmission application on a gateway of an AS network using the security configuration, the data transmission application configured to exchange data with at least one computing device outside the AS network; and means for transmitting data from one of the plurality of AS devices through the data transmission application, wherein the actions of the data transmission application are defined by the security configuration.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
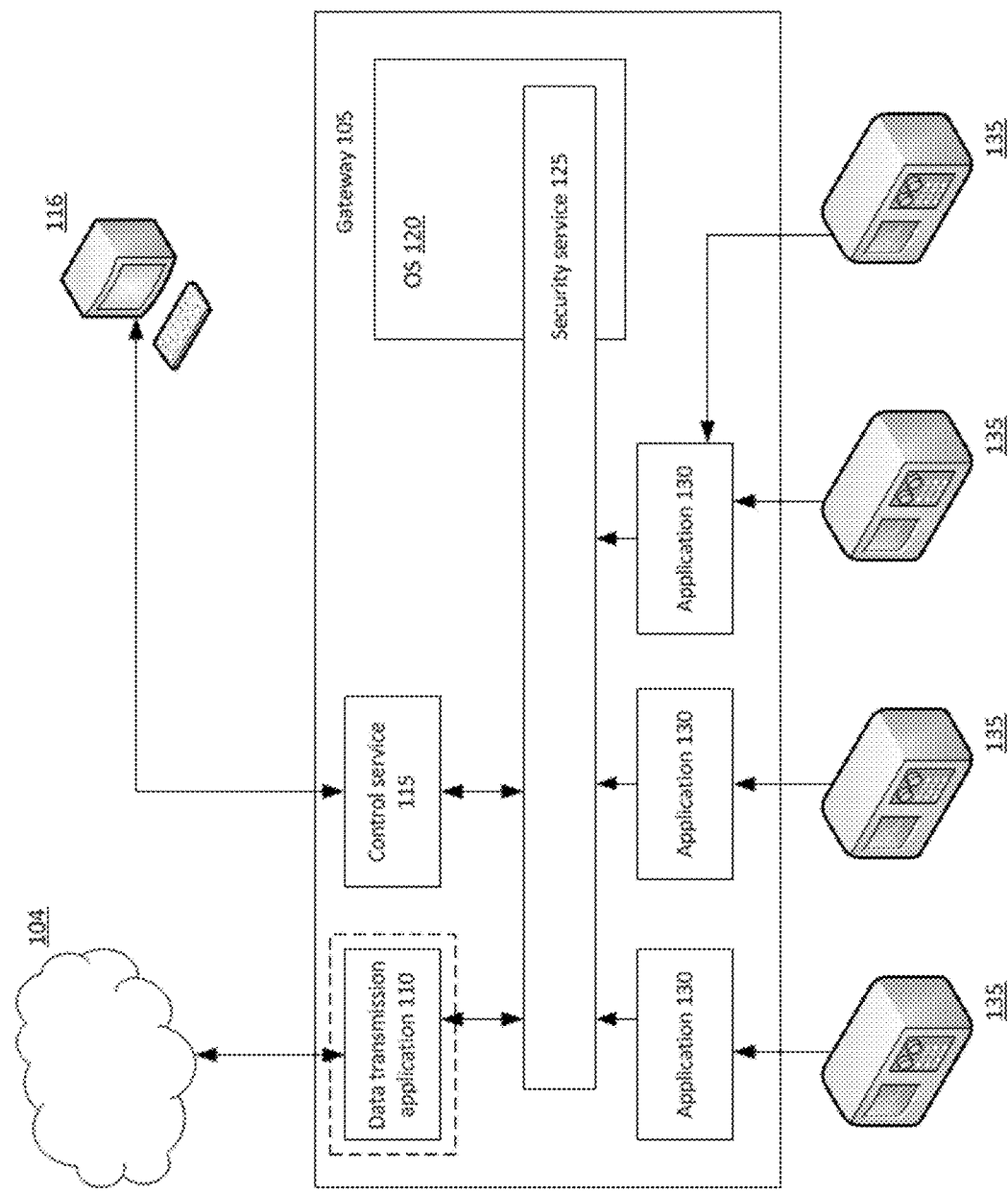
FIG. 1 is a block diagram of a system for protecting an automated system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following definitions and concepts are used throughout the description in particular embodiments.

For example, an "automated system" includes a system of personnel and a set of tools for automation of activity which implements information technology for execution of established functions. An example of an automated system can be an automated control system (ACS); in particular, an automated process control system (APCS), or a system of sensors or other devices of a "smart home" or another network, which implement the concept of the "Internet of Things" (IoT). In general, an AS means devices connected by a network access to which from outside is to be strictly regulated (namely, limited, for example, to "read-only" access). Accordingly, and as described herein, embodiments protect a set of automated system automation tools; namely, devices of an automated system.

In an embodiment, a security gateway (or "gateway") is a point of connection between networks, between segments of networks, or between software applications in various security domains. In embodiments, a gateway is configured to protect the network in accordance with a security policy. A gateway includes a computing device connecting segments of networks, wherein one of such networks is a network connecting AS devices.

In an embodiment, a security configuration is a formalized (for example, as an XML file) set of requirements for applications whose execution ensures the required level of information security of the automated system. A security configuration can be a part of a security policy.

In an embodiment, a package of application programs (sometimes referred to as an "applications package") is a set of inter-related programs for solving tasks of a certain class from a specific application field. An example of an application package can be a service pack (meaning a service as an application).

In an embodiment, a service (sometimes referred to as a "daemon") is an application operating in background mode.

In an embodiment, a malicious application is an application able to harm a computer or computer user data (in other words, a computer system), such as a network worm, a keyboard spy, or a computer virus. The harm can consist in unauthorized access to the computer's resources, including data stored in the computer, with the purpose of theft, as well as misuse of the resources, i.e. in order to store data, to perform calculations, etc.

In an embodiment, a trusted application is an application which does not harm a computer or its user. An application can be considered trusted if the application was developed by a trusted software developer, if the application was downloaded from a trusted source (for example, a site included in a database of trusted sites), or if the application's ID (or other data allowing to definitely identify the application, for example, the hash sum of the application file) is stored in a database of trusted applications. A manufacturer ID, for example, a digital certificate, can also be stored in a trusted applications database. In an embodiment, a trusted application can be installed from a trusted application package.

In an embodiment, a non-trusted application is an application which is not trusted but was not recognized (for example, by an antivirus application) as malicious, either. A non-trusted application can be subsequently recognized as malicious (for example, using an antivirus check).

In an embodiment, a malicious file is a file which is a component of a malicious application and contains program code (executable or interpreted code).

In an embodiment, a non-trusted file is a file which is a component of a non-trusted application and contains program code (executable or interpreted code).

In an embodiment, a trusted file is a file which is a component of a trusted application.

Tools of a system for protection of automated systems using a gateway in this invention can be actual devices, systems, components, and groups of components designed using hardware means, such as application-specific integrated circuits (ASICs) or field-programmable gate arrays (FPGAs), or, for example, as a combination of software and hardware means, such as a microprocessor system and a set of program instructions, as well as neurosynaptic chips. The functionality of the above-mentioned system tools can be provided by hardware means only, or as a combination where the functionality of the system tools is provided partially by software means and partially by hardware means. In some embodiments, some or all of the tools can be implemented using the processor of a general purpose computer (for example, the one shown in FIG. 5). Also, system components can be configured either within a single computer or divided between multiple linked computers.

Referring to FIG. 1, a block diagram of a system 100 for protecting an automated system is depicted, according to an embodiment. System 100 generally includes a cloud data service 104, a control tool 116, automated system devices 135, a gateway 105 functioning under the control of an operating system (OS) 120, and applications 130 functioning within the gateway 105.

In an embodiment, the cloud data service 104 is a firmware complex configured to provide the information collected by the automated system devices 135. In another embodiment, the cloud data service 104 can also be used to control the AS devices 135. Siemens MindSphere is one example of the cloud data service 104.

Examples of the data provided by the cloud service 104 are: AS device operation status (on/off or in a state of processing a component); position of the AS device tool (position in space, inclination angles) which influences the component being processed; time of the AS device's operation from the moment of component replacement (in other words, component wear); hygrometer readings; thermometer readings; accelerometer readings; readings from other sensors located on AS devices.

The devices 135 are AS devices which can execute received commands and provide operational or functioning data, such as actuators, sensors, etc. Various data transfer protocols, for example, OPC UA or ModBus, can be used for transfer of data between the gateway 105 and the devices 135.

Examples of the devices 135 are a humidity sensor; an illumination sensor; a pressure (for example, atmospheric pressure) sensor; a drive control unit (for example, for doors, cutters, valves, etc.); a CNC machine; a motor; an industrial controller, to which, for example, sensors are connected; any other device used in the industry or as a smart home device able to provide information and/or execute received commands.

The control tool 116 is a computing device designed to control AS computing devices. For example, the control tool 116 can send commands to one or more AS computing devices. In one embodiment, the control tool 116 is located outside the AS, and the data exchange between the tool 116 and the AS devices is carried out via a computing device that has access to both resources outside the AS network and devices of the AS itself. An example of such computing device is the gateway 105, which limits the AS network (i.e. connects the AS network and the network outside the AS). This example of a computing device used as a gateway 105 is used below to describe an embodiment of the operation of the system, without compromising the commonality of the above-mentioned computing device. In this case, examples of control carried out by the control tool 116 in relation to AS devices can include the transfer of the following to an AS device: software packages (for example, services or updates); a command for installation of software packages; security configurations (as well as configuration parameters, examples of which will be provided below); commands for start/stop of operations.

An example of a security configuration, namely, a requirement included in a security configuration, looks as follows (formalized using XML):

```
<constraint_list>
    <rule>
        <source type = TransmissionApp/>
        <action type = function_call,
        function_name = GetProcAddress,
        reaction = deny_function_call/>
    </rule>
</constraint-list>
```

The aforementioned requirement prohibits a data transmission application, for example, a data transmission service, from calling (deny_function_call) the GetProcAddress function (function_name=GetProcAddress). In other words, the requirement stipulates the absence of calls (or prohibition of calls) for the GetProcAddress function by the data transmission application.

Examples of requirements included in a security configuration can include absence of, or prohibiting, the use of unsafe data structures; absence of, or prohibiting, the use of unsafe API functions; absence of, or prohibiting, the use of executable code, for example, a code of executable file libraries, about which it is known that the code contains vulnerabilities; absence of, or prohibiting, violations of preassigned security policies; absence of, or prohibiting, a preassigned application's access to the data (including data provided by other applications and received using requests, for example, SQL) to which it must not have access in accordance with an access monitoring model (for example, Bell-LaPadula) or a security policy; absence of, or prohibiting, calls for functions for which known signatures (function descriptions) are preassigned, which determine the format and size of allowable function parameters, with parameters not stipulated by the function signature; absence of, or prohibiting, calls, by a preassigned application, for functions from a list of prohibited functions assigned to that application (such lists can be stored in a database linked with a security service 125).

The control tool 116 is further configured for building a security configuration; collecting information about the architecture of an automated system; analysis of assembly components of applications designed for execution at the gateway 105, in order to check for compliance of the application assembly components with the security configuration; and assembly of an application using application assembly components, resulting in the building of an application package.

In this case, the assembly components are the data used to assemble the application package. Such data can include the files of the application's source code. The assembly process consists in creating an application package (a software package) from application components, in particular, compiling the application's executable files, and subsequently organizing the compilation results.

The architecture of an automated system includes the information describing the complex of hardware and software functioning within an automated system. In an embodiment, architecture information includes a list of devices with an indication of the purpose of each device; the topology of the automated system's networks, as well as the location of the gateway to which the data transmission application 110 must be installed, in relation to the other devices; a list of applications installed on the gateway, with indication of the purpose of each application; a list of known vulnerabilities for each application installed on the gateway; a list of data exchange protocols (Modbus, OPC UA, etc.) applicable to each application installed on the gateway, as well as information about the known vulnerabilities of the data transmission protocols.

In an embodiment, the control tool 116 is configured to use data about the architecture of the AS when building a security configuration. Such accounting of the architecture of the automated system for the building of a security configuration ensures at least the protection of the automated system's devices against malicious actions which can be carried out on behalf of the application, if, for example, the application is compromised. An example of a compromised application, in particular, of the data transmission application 110, can be unlawful gaining of remote access to the execution of the code on behalf of the application 110 (in other words, executing the code from the address space of the launched application 110).

An example of building a security configuration based on the AS architecture includes adding to the security configuration a requirement of the following type: "absence of function calls by a pointer to the function from a library from the application's side" for each application configured for transmission of data from AS devices 135. In an embodiment, an application configured for transmission of data from AS devices 135 can include data out of the AS network. In an embodiment, GetProcAddress is an example of such a function.

Another example of building a security configuration based on the AS architecture includes adding to the security configuration a requirement of the following type: "absence of calls for the function of loading of executable code into the address space of the process on the part of the application" for each application configured for transmission of data, for example, out of the AS network. In an embodiment, LoadLibrary is an example of such a function.

Another example of building a security configuration based on the AS architecture includes adding to the security configuration a requirement of the following type: "absence of calls for device control functions on the side of the application." In an embodiment, the requirement can be conditioned on whether the purpose of the application is to transmit data and the purpose of the device is not limited to the collection and provision of data.

Another example of building a security configuration based on the AS architecture includes adding to the security configuration a requirement of the following type: "absence of transmission of data using a protocol for transmission of data in which the format does not match a preassigned signature." In an embodiment, the requirement can be conditioned on whether the application operates with a protocol that has known vulnerabilities. In an example, a preassigned signature can be the format of a package with a size not exceeding the preassigned number of bytes, such as 128 bytes.

One skilled in the art will appreciate that the aforementioned embodiments use information about the AS architecture with the purpose of limiting applications. Further, such limitation is to the capability of applications to execute actions that can be used to gain unlawful access to AS resources, such as AS devices. Other limitations are possible, including limitations to the network, AS devices, operating system, etc., as well as subgroups of the components of the system.

For the above-mentioned functions to be executed by the tool 116 and by the devices 135, the following applications are installed and operate on the gateway 105: a control service 115 configured for receiving data and executing commands from the control tool 116, and applications 130 for receiving data from devices 135 and providing data to data consumers (servicing of the devices 135), such as data transmission application 110 configured to provide accessible information about the AS architecture (for example, the purpose of the respective device 135).

In an embodiment, as mentioned above, the gateway 105 operates under the control of an OS 120. In one embodiment, the operating system 120 is a microkernel OS. This kind of OS processes all inter-process communication (IPC) functions called by applications (in particular, services) of the gateway 105, and, using the security server 125, carries out its functions of protecting the applications 130 (for example, protecting trusted applications against actions by non-trusted or compromised applications), and, accordingly, devices 135.

Protection of the applications 130 (which, accordingly, ensures the protection of the devices 135) is carried out by limiting the actions of applications that can be sources of malicious activity (in particular, as was mentioned earlier, activity involving unlawful access to AS resources). Limiting can mean prohibiting execution of inter-process interaction functions. In this case, limitations of application actions are defined by the security configuration used by the security service 125 to decide which inter-process interaction functions are allowed and which inter-process interaction functions are not allowed.

In an embodiment, the applications 130 operating on the gateway 105 are configured to receive data from the devices 135. Data can be received using an industrial data transmission protocol such as OPC UA or ModBus. Therefore, the transmission of data (for example, data about the state of a technical process, or sensor readings) from the devices 135 to the gateway 105, and, if needed, further to the cloud data service 104, is carried out using applications 130. In embodiments, each application can service exactly one device 135 or multiple devices 135.

To transmit data from the gateway 105 to the cloud data service 104, a data transmission application 110 can be used. In embodiments, the data transmission application 110 can operate at the gateway. Such data transmission applications 110 are usually provided by owners, developers, or administrators of cloud data services 104 in the form of software packages to be installed to the computing device. For example, computing device can comprise gateway 105. Via a data transmission application 110, gateway 105 transmits data from the connected devices 135 (using the application 130) to the cloud data service 104. In another embodiment, the data transmission application 110 is provided in the form of assembly components. The cloud data service 104 can be used to aggregate data and accordingly provide information received from the devices 130. A cloud data service 104 can be connected to a computing device when the computing device is in the user's home (or the user carries it with him/her, if it is a mobile computing device), which collects information from various sensors of a "smart home" devices. Subsequently, the cloud data service 104 allows the user to remotely track the state (and sometimes the control of the states) of his/her home's devices, for example, using a smartphone.

Since the data transmission application 110 is provided by a third party (such as the above-described owners, developers, or administrators of cloud data services 104) for installation to the gateway 105, the data transmission application 110 is not trusted. Thus, there is a risk that the application 110 will be compromised. For example, using vulnerabilities of the application 110, an offender can gain access to the devices 135 of the AS and to the applications 130 of the gateway 105 (to the automated system's firmware complex) using the untrusted application 110.

To address this vulnerability, an OS 120 that controls the functioning of the gateway 105, together with the security service 125, which, based on the security configuration, decide which inter-process interaction functions are to be blocked and which inter-process interaction functions are allowed. In particular, such functions can be for receiving data by the data transmission application 110 from applications 130 connected to the devices 135. Such calls are generally safe for the devices 130 of the AS, and thus the security configuration does not prescribe the blocking of such calls, as they are intended directly to complete a task related to data transmission from the devices 130 to the cloud service 104. On the other hand, other actions (calls for IPC inter-process interaction functions) by the data transmission application 110, which go beyond the limits of the security configuration, are blocked by the security service 125, thereby providing the required security (in particular, information security) level of the AS devices 130.

A microkernel architecture for the OS 120 can be utilized to completely monitor the interaction of the applications functioning at the gateway 105, such as the data transmission application 110, the control service 115 and other applications 130.

Figure 2:
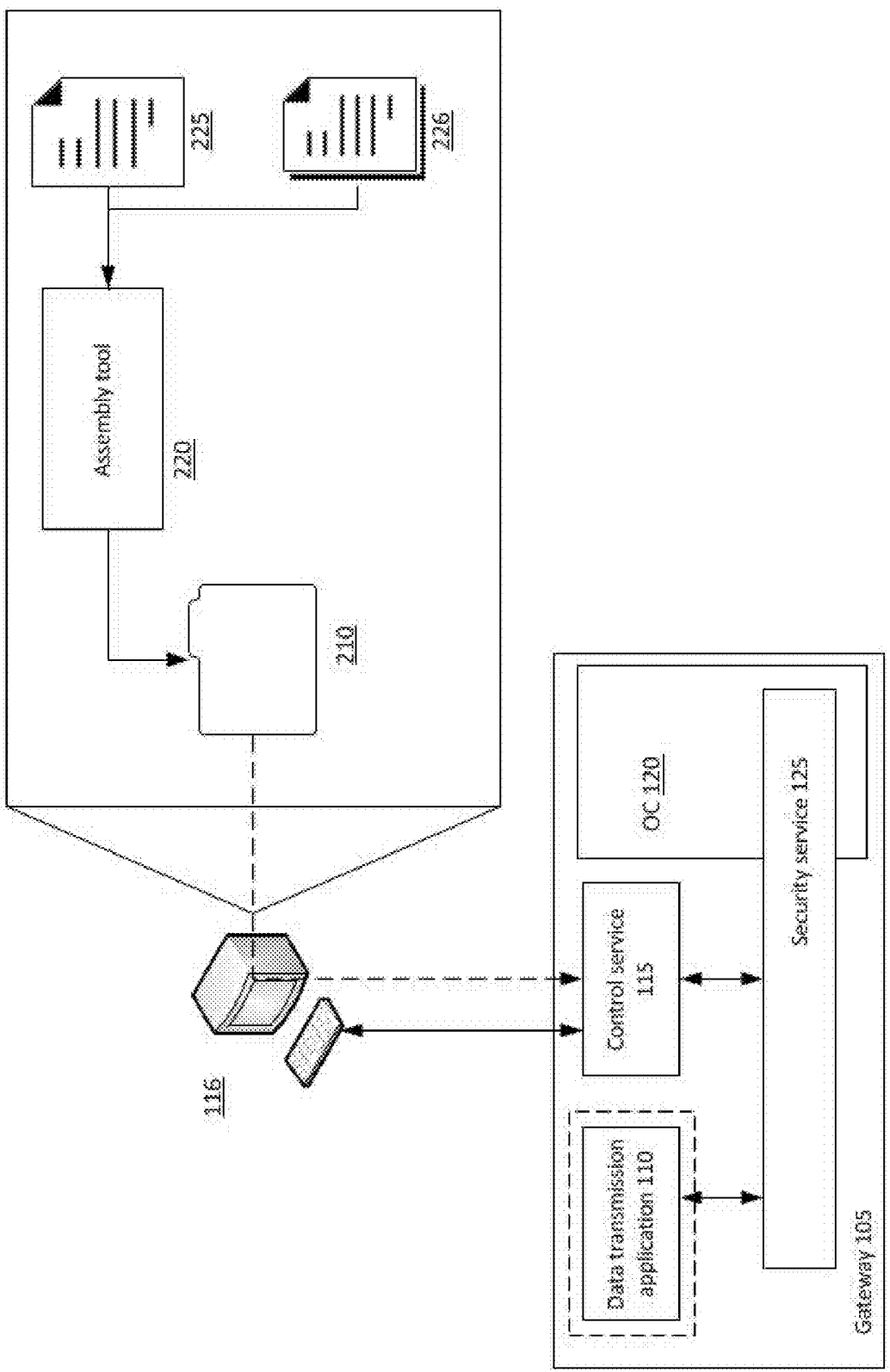
FIG. 2 is a block diagram of another system for protecting an automated system, according to an embodiment.

Referring to FIG. 2, a block diagram of another system for protecting an automated system is depicted, according to an embodiment. The system 200 includes a control tool 116, which, in turn, includes an assembly tool 220, and a computing device, of which the gateway 105 is an example and on which OSs 120 operate. In an embodiment, the OS 120 is a microkernel OS, the specifics of which are provided in the description of FIG. 1. In another embodiment, no special architecture requirements are applied to the OS 120. In one embodiment, the gateway 105, just as in the description of FIG. 1, connects the devices 130 and the cloud service 104.

The gateway 105 can include a control service 115, which is able to install application packages to a computing device, and in particular, to the gateway 105. In one embodiment, such an application package is provided by the control tool 116.

In an embodiment, the control tool 116 is configured to store packages of applications (services) that can be installed to AS devices, and in particular, to the gateway 105. For example, packages of applications can be stored in the hardware of control tool 116, or in a database (not shown in FIG. 2). Data (for example, previously loaded from a remote server to such a storage) can be written by a specialist or using dedicated software. In one embodiment, the control tool 116 server is owned and/or used by developers of the relevant software, the package of which is stored by the control tool 116.

In another embodiment, the control tool 116 is itself capable of building an application package 210 (in particular, a service package) using the assembly components 226 of an application. In such an embodiment, the assembly itself is carried out by the assembly tool 220, which can be a component of the control tool 116 or an independent remotely functioning tool. The application package obtained using the assembly tool 220 can be subsequently installed by the control tool 116 to the AS gateway 105.

In an embodiment, the assembly tool 220 is also configured to analyze the assembly components 226 for compliance with the security configuration 225. In this case, the security configuration 225 can be built by the tool 116 or provided by an information security specialist or by another outside service, for example, one that builds security configurations as a service. The result of the analysis of the application's assembly components 226 is a determination whether the assembly component 226 matches (meets) the security configuration 225 or not.

In one embodiment, in order to build an application package 210, the assembly tool 220 uses only assembly components 226 that have been analyzed and satisfy the security configuration 225 (both separately and together with the security configuration requirements applied to such components 226). In this case, the assembly tool 220 builds a trusted application package. In other words, a trusted application package is an application package built by the assembly tool 220 from the assembly components matching the security configuration.

The assembly tool 220 is also configured to modify the assembly components not satisfying the security configuration 225, so that such components do satisfy the security configuration 225. In one embodiment, this operation is the final step performed by the assembly tool 220 when analyzing the assembly component 226, and if a component 226 does not satisfy the security configuration 225.

In order to check whether an assembly component 226 matches the security configuration 225, the assembly tool performs an analysis. Within such analysis, the assembly tool 220 can collect the following information about the assembly component 226: information about vulnerabilities (e.g. at least known vulnerabilities) contained in the assembly component 226; information about the data structures being used; information about the API functions and methods being used; information about the data transmission protocols used by the code of the assembly components 226.

If the analysis determines that an assembly component 226 does not match the security configuration 225, the assembly tool 220 modifies (if possible) the relevant assembly component 226. In order to make such an assembly component 226 match the security configuration 225, the assembly tool 220 can: if vulnerabilities are found in the assembly component 226, replace the assembly component 226 with an earlier version of a similar component that does not have the vulnerabilities or update the assembly component 226 with security patch; if unsafe data structures are used in the assembly component 226, replace such uses (calls) with the use of safe analogues, for example, thread safe data types; if unsafe API functions are used in the assembly component 226, replace such uses (calls) with the use of safe analogues, for example, by replacing scanf function calls with scanf s function calls.

In an embodiment, the security configuration 225 includes a requirement that the assembly components 226 must be resistant to ROP (return-oriented programming) attacks. In this case, the assembly tool 220 views each assembly component 226 as vulnerable to ROP attacks when an offender initiates the execution of the code in the executable file so that sequences are completed for the instructions (which can include interpreted sequences of the executable file's bytes) so that the offender is able to pass control (for example, using a stack). Accordingly, such a sequence of instructions would be an executable code performing some kind of attack. In order to bring such assembly component 226 into compliance with the security configuration 225, the assembly tool 220 can obfuscate the source code so that the newly built executable file would not lend itself to a ROP attack. If a ROP attack is used, a key to the attack is an offender knowing about the byte code of the executable file, as it is the byte code that is analyzed in order to build a ROP chain of instructions which performs the offender's attack. By obfuscating the source code, this kind of attack is not possible.

In another embodiment, the security configuration 225 includes a requirement that the assembly components 226 must not contain vulnerabilities detectable by fuzzing (testing for vulnerabilities). In such an embodiment, the assembly tool 220 views each assembly component 226 as potentially vulnerable (having vulnerabilities in the code). In order to bring such assembly components 226 into compliance with the security configuration 225, the assembly tool 220 can perform fuzzing for the purpose of subsequent elimination of the detected vulnerabilities.

An assembly component 226 modified as described above can be used by the assembly tool 220 together with the other security components 226 that match the security configuration 225 to build a trusted application package 210. Such a trusted application package 210 can be subsequently sent by the control tool 116 to an AS computing device, such as the gateway 105. In one embodiment, a trusted application package 220 is, for example, a trusted package of a data transmission application 110 configured to be installed to the gateway 105.

In an embodiment, a trusted application package 210 can be built by the assembly tool 220 using assembly components 226 that do not match the security configuration 225. In that case, in order for such an application, once installed, to be safe for the AS devices 135 (not to harm the AS devices), the application package is built from assembly components 226, then supplemented by a set of requirements of the security configuration 225 breached by the assembly components 226. Once an application from such package 210 is installed to a computing device, for example, to a gateway 105, the application's operation is limited by the security service 125 in accordance with the set of requirements of the security configuration 225 added to the application package 210. In this manner, the application from the application package 210 is installed using a method which is safe for the AS devices 135. In other words, the composing of a trusted application package 210 uses not only an assembly component 226 that does not satisfy the requirements of the security configuration 225, but the same component 226 together with the set of requirements for the security configuration 225 which it does not match (and thus consider the component 226 to be matching the security configuration 225 when it is used to assemble an application package 210 together with the above-mentioned set of requirements for the security configuration 225).

In an embodiment, the application package 210 is configured not to install an application but to update an application that is already installed to a gateway 105. In this case, the application package 210 can be used to replace the executable code of an application or to update a set of requirements for a security configuration 225, which, when the application is installed, are sent to a security service 125 in order to ensure the required level of security for AS devices 135.

Figure 3:
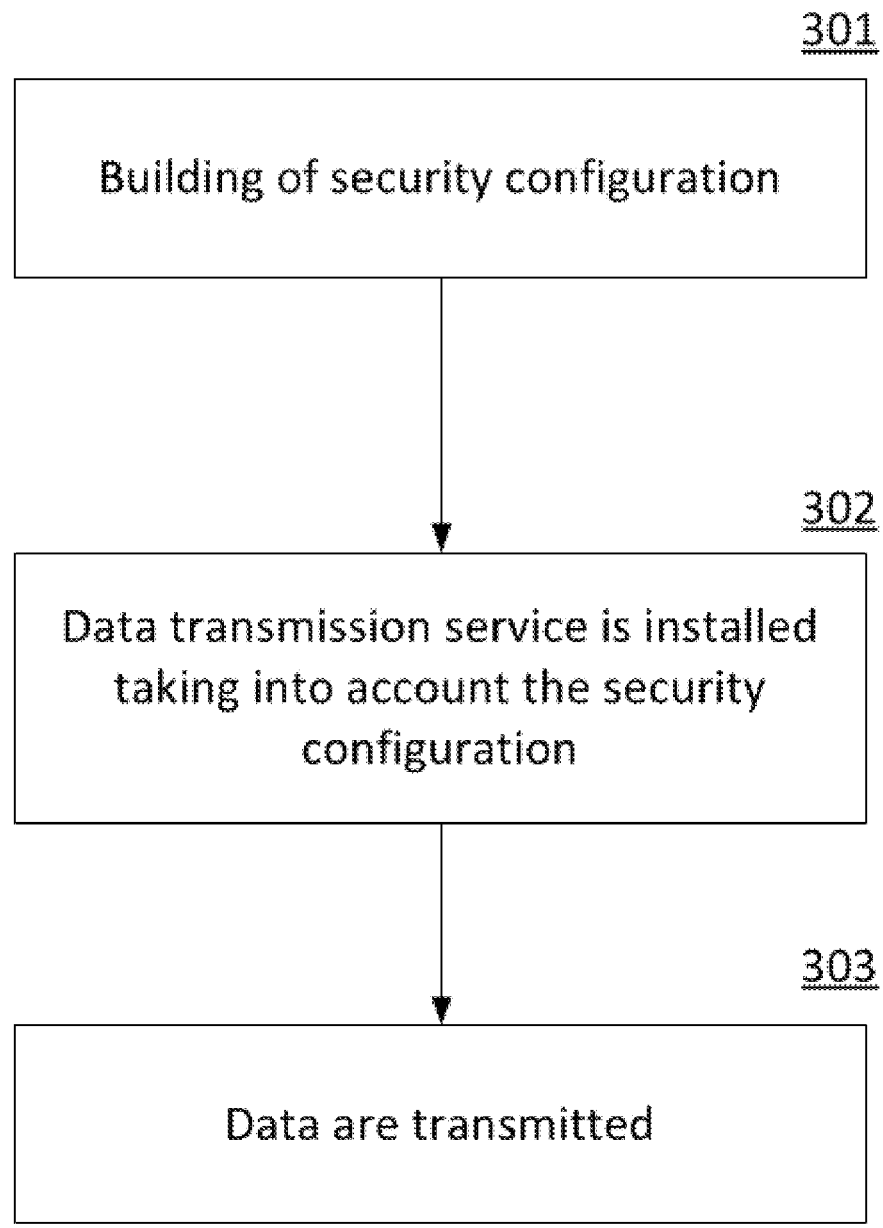
FIG. 3 is a flowchart of a method for protecting an automated system, according to an embodiment.

Referring to FIG. 3, a flowchart of a method 300 for protecting an automated system is depicted, according to an embodiment. At 301, the method 300 builds a security configuration. Compliance with the requirements of the security configuration ensures a required security level for the devices of an automated system. The security configuration can be built by the control tool 116 taking into account the architecture of the automated system in order to secure the devices and applications that can be targeted by offender attacks. The newly built security configuration is used at 302 by the control service 115. For example, the control service 115 can operate within a computing device, in particular, a gateway 105 of an automated system, to install an application configured to exchange data with computing devices outside the automated system's network. In one embodiment, such application is a data transmission application 110 configured to interact with a cloud data service 104, for example, MindSphere. The use of a security configuration when installing an application 110 allows the security service 125 of the operating system 120 to check and ensure that the data transmission application 110 complies with the security configuration. Subsequently, at 303 data is transmitted from the automated system's devices through the gateway 105, and namely, through the data transmission application 110 functioning at the gateway 105, to the cloud data service 104, in such a manner that all actions of the data transmission application 110 are monitored by a security service 125. Accordingly, the security of the automated system's devices during data transmission using the data transmission application 110 (which is provided by a third party and is not a trusted application) is ensured.

The data transmission application 110 can be attacked by offenders and thus can be compromised to execute the commands of the offenders. Accordingly, implementation of the method 300 ensures that the data transmission application 110 provided by a third party (usually, by developers or owners of a cloud data service 104), unless it is trusted, does not perform actions (by calling functions and IPCs) protected by the security configuration taken into account at the installation of the application 110. Therefore, security of the automated system's devices 135 (and applications 130) is ensured, because even a compromised data transmission application 110 will not be able to gain access to the AS devices 135 not provided for by the security configuration. In this way, AS devices 135 are protected using a gateway 105 that implements the principle of a data "diode," thereby allowing the data to be transmitted from inside to the cloud service 104 while preventing commands from outside. In particular, commands sent from the "outside" through the communication channels connecting the gateway 105 and the cloud service 104, from influencing the AS devices 135 are prevented.

Figure 4:
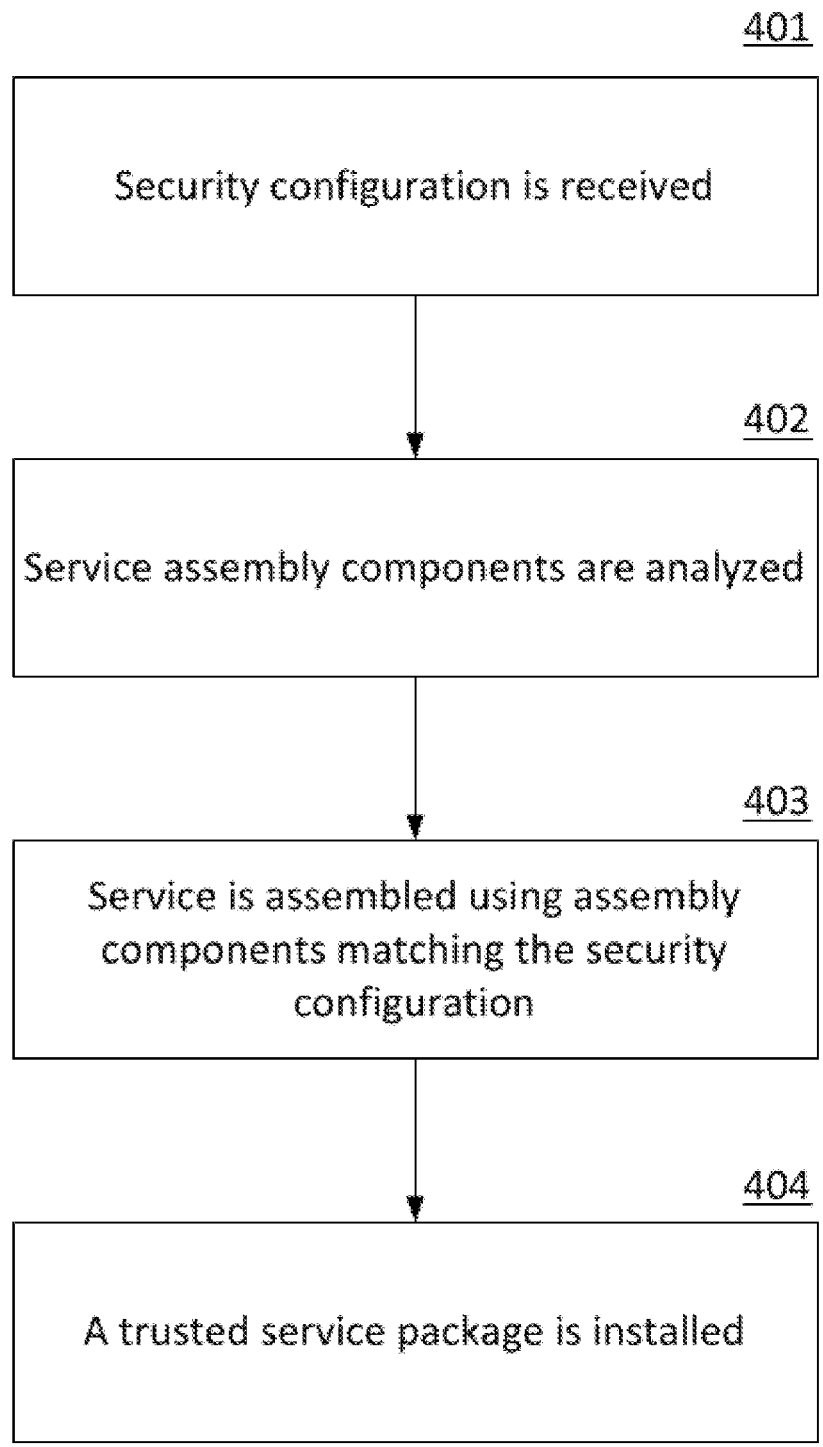
FIG. 4 is a flowchart of another method for protecting an automated system, according to an embodiment.

Referring to FIG. 4, a flowchart of another method 400 for protecting an automated system is depicted, according to an embodiment.

At 401, a control tool 116 receives a security configuration 225. Compliance with the requirements of the security configuration ensures the required security level for the automated system's devices. In one embodiment, such a security configuration can be created by the tool 116. In another embodiment, a security configuration can be provided by an information security specialist. Subsequently, at 402, the assembly tool 220 analyzes the assembly components 226 of the application which needs to be installed to the computing device of the automated system. In one embodiment, such device is a gateway 105, while the application is a data transmission application 110 that makes the information provided by the automated system devices 135 accessible at the cloud data service 104. As a result of such analysis, a decision is made regarding each assembly component 226 by the assembly tool 220 as to whether the assembly component 226 matches the security configuration.

In an embodiment, the assembly tool 220 is configured to modify the assembly components 226 of an application (for example, a data transmission application). Such modification can be made for the assembly components 226 determined to not match the security configuration 225 as part of the analysis at 402. Thus, once the modifications are made, the modified assembly components 226 match the security configuration 225.

At 403, the assembly tool 220 builds an application package 210. In an embodiment, the data application package can be build for a data transmission application 110. In an embodiment, the building of a package 210 uses only the assembly components 226 matching the security configuration 225. A trusted application package thereby obtained. At 404, the trusted application package is installed by the control service 115. In an embodiment, the computing device is the gateway 105, while the application is a data transmission application 110.

If, however, it is not possible to change the assembly component 226 not matching the security configuration 225 at 402, in order for the assembly component 226 to match the security configuration 225, then, the application package 220 built by the assembly tool is subsequently installed to the computing device of the automated system taking into account the security configuration 225, which ensures security of the automated system's devices 135 in the conditions where one of the AS computing devices has an application installed which has at least one assembly component 226 that does not match the security configuration 225.

It is possible that an application on an AS computing device will be attacked by offenders and compromised in order to execute the commands of the offenders. In this case, in accordance with method 400, the application or service provided in the form of assembly components 226, for example, by a third party (if the application is a data transmission application 110, the assembly components 226 are usually provided by developers/owners of the cloud data service 104), will be installed to the AS computing device so as to exclude the possibility to perform actions (by calling functions and IPC) or to use data structures prohibited by the security configuration 225. Security is achieved by building and subsequently installing a trusted application package (or, for example, a service package) 220, which is built from assembly components 226 matching the security configuration 225.

Therefore, method 400 ensures security of the devices 135 (and applications 130) of an automated system, because even a compromised application (in particular, a data transmission application 110) installed from a trusted application package 220 will not be able to perform actions prohibited by the security configuration 225 at the stage of building an application package 220.

Method 400 further ensures the security of AS devices 135 using the fact that the applications being installed to the computing device (for example, the data transmission application 110) are less likely to be compromised. This is because at least the security configuration 225 prohibits the building of an application package 220 for subsequent installation on the computing device, if the assembly components contain vulnerabilities.

Figure 5:
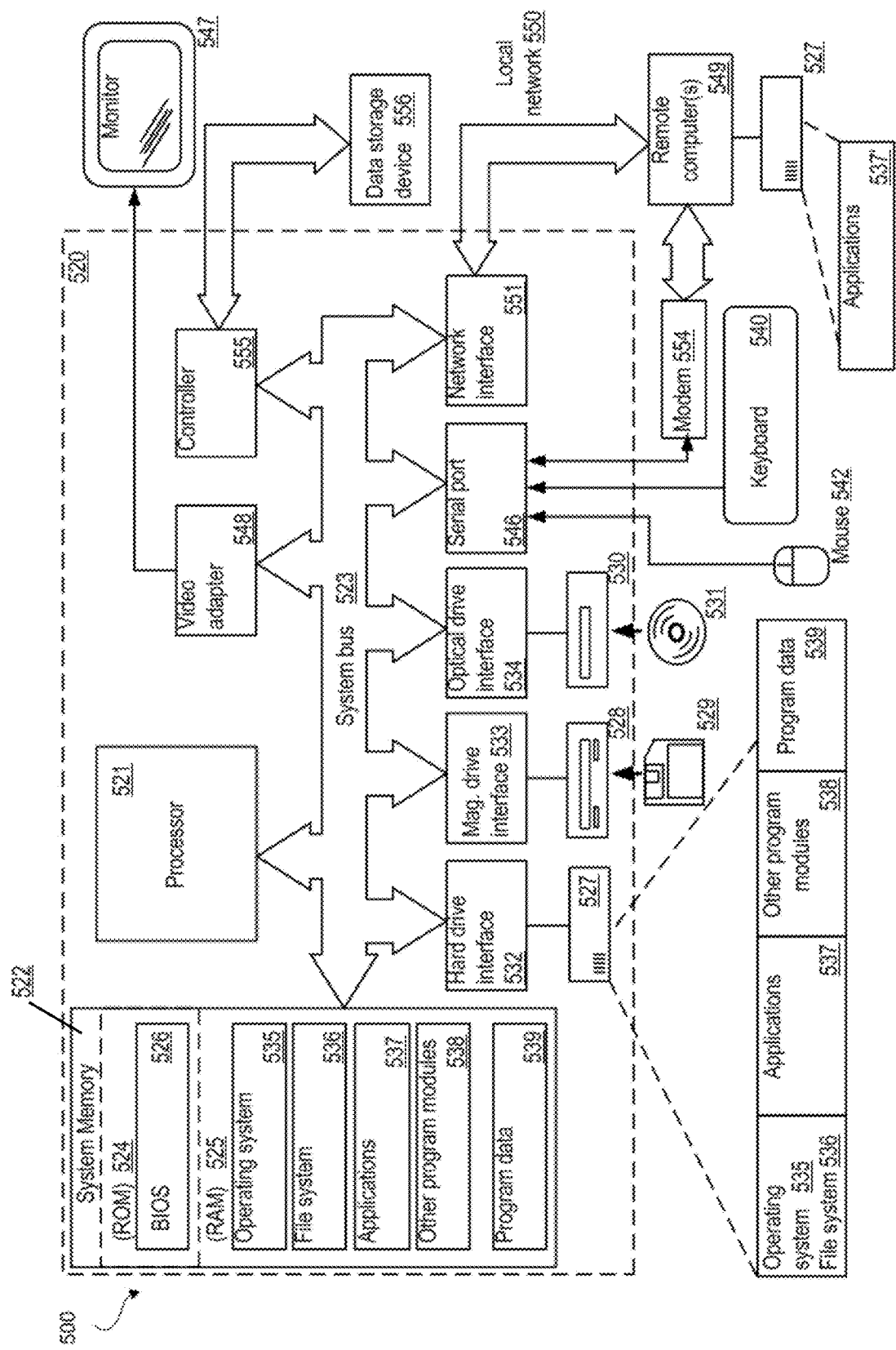
FIG. 5 is a block diagram of a computer system configured to implement embodiments described herein.

Referring to FIG. 5, a diagram illustrating in greater detail a computer system 500 on which aspects of the invention as described herein may be implemented according to various embodiments is depicted.

The computer system 500 can comprise a computing device such as a personal computer 520 includes one or more processing units 521, a system memory 522 and a system bus 523, which contains various system components, including a memory connected with the one or more processing units 521. In various embodiments, the processing units 521 can include multiple logical cores that are able to process information stored on computer readable media. The system bus 523 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 524 or volatile memory such as Random Access Memory (RAM) 525. The Basic Input/Output System (BIOS) 526 contains basic procedures ensuring transfer of information between the elements of personal computer 520, for example, during the operating system boot using ROM 524.

Personal computer 520, in turn, has a hard drive 527 for data reading and writing, a magnetic disk drive 528 for reading and writing on removable magnetic disks 529, and an optical drive 530 for reading and writing on removable optical disks 531, such as CD-ROM, DVD-ROM and other optical media. The hard drive 527, the magnetic drive 528, and the optical drive 530 are connected with system bus 523 through a hard drive interface 532, a magnetic drive interface 533 and an optical drive interface 534, respectively. The drives and the corresponding computer information media represent energy-independent means for storage of computer instructions, data structures, program modules and other data on personal computer 520.

The system depicted includes hard drive 527, a removable magnetic drive 529 and a removable optical drive 530, but it should be understood that it is possible to use other types of computer media, capable of storing data in a computer-readable form (solid state drives, flash memory cards, digital disks, random-access memory (RAM), etc.) connected to system bus 523 through a controller 555.

The computer 520 comprises a file system 536, where the recorded operating system 535 is stored, as well as additional program applications 537, other program engines 538 and program data 539. The user can input commands and information into the personal computer 520 using input devices (keyboard 540, mouse 542). Other input devices (not shown) can also be used, such as: a microphone, a joystick, a game console, a scanner, etc. Such input devices are usually connected to the computer system 520 through a serial port 546, which, in turn, is connected to a system bus, but they can also be connected in a different way—for example, using a parallel port, a game port or a Universal Serial Bus (USB). The monitor 547 or another type of display device is also connected to system bus 523 through an interface, such as a video adapter 548. In addition to monitor 547, personal computer 520 can be equipped with other peripheral output devices (not shown), such as speakers, a printer, etc.

Personal computer 520 is able to work in a network environment; in this case, it uses a network connection with one or several other remote computers 549. Remote computer(s) 549 is (are) similar personal computers or servers, which have most or all of the above elements, noted earlier when describing the substance of personal computer 520 shown in FIG. 5. The computing network can also have other devices, such as routers, network stations, peering devices or other network nodes.

Network connections can constitute a Local Area Network (LAN) 550 and a World Area Network (WAN). Such networks are used in corporate computer networks or in corporate intranets, and usually have access to the Internet. In LAN or WAN networks, personal computer 520 is connected to the Local Area Network 550 through a network adapter or a network interface 551. When using networks, personal computer 520 can use a modem 554 or other means for connection to a world area network, such as the Internet. Modem 554, which is an internal or an external device, is connected to system bus 523 through serial port 546. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for protecting an automated system (AS), the AS including a plurality of AS devices, the method comprising:
   building a security configuration based on architecture data of the AS, wherein compliance with the security configuration ensures a security level for the plurality of AS devices;
   building a package for installation of a data transmission application, wherein the data transmission application is configured to exchange data with at least one computing device outside the AS network, and wherein the package uses only assembly components matching the security configuration;
   installing the data transmission application on a gateway of an AS network using the package; and
   transmitting data from one of the plurality of AS devices through the data transmission application, wherein the actions of the data transmission application are defined by the security configuration to block at least one inter-process interaction function of the data transmission application.

2. The method of claim 1, further comprising:
   utilizing a microkernel OS configured to process all inter-process communication from a plurality of applications operating on the gateway.

3. The method of claim 2, wherein the plurality of applications includes the data transmission application and the actions of the data transmission application are defined using the microkernel OS.

4. The method of claim 3, wherein limits of the actions of the data transmission application are determined by the security configuration and considered when installing the data transmission application on the gateway.

5. The method of claim 1, further comprising collecting the architecture data of the AS, wherein the architecture data includes at least one of:
   a list of AS devices;
   a topology of the AS;
   a list of applications installed on the gateway;
   a list of known vulnerabilities for each application installed on the gateway; and
   a list of data exchange protocols operable with each application installed on the gateway and known vulnerabilities of the data exchange protocols.

6. The method of claim 1, wherein building the security configuration based on the architecture data of the AS includes at least one of:
   preventing a function call when the function is accessed through a pointer;
   preventing a function call to load executable code into the address space of the function;
   preventing a function call for an AS device control function; and
   preventing transmission of data for a protocol that does not match a preassigned signature.

7. The method of claim 1, wherein the actions of the data transmission application are defined by the security configuration by at least one of:
   prohibiting use of an unsafe data structure;
   prohibiting use of an unsafe API function;
   prohibiting execution of known vulnerable code;
   prohibiting a violation of a preassigned security policy;
   prohibiting access of an AS device application to data;
   prohibiting a function call having a function signature with function parameters outside of function parameters defined by known signatures; and
   prohibiting a function call based on a list of prohibited functions.

8. The method of claim 1, further comprising:
   installing a control service on the gateway, the control service configured to install the data transmission application on the gateway.

9. The method of claim 1, wherein the data transmission application is configured to interact with a cloud data service.

10. The method of claim 9, wherein the security configuration allows data to be transmitted from the data transmission application to a cloud data service and prevents at least one command to at least one AS device from outside the AS network.

11. A system for protecting an automated system (AS), the AS including a plurality of AS devices, the system comprising:
    a control tool including;
       a control tool computing platform including control tool computing hardware of at least one control tool processor and control tool memory operably coupled to the at least one control tool processor;
       instructions that, when executed on the control tool computing platform, cause the control tool computing platform to:
          build a security configuration based on architecture data of the AS, wherein compliance with the security configuration ensures a security level for the plurality of AS devices, and
          build a package for installation of a data transmission application, wherein the data transmission application is configured to exchange data with at least one computing device outside the AS network, and wherein the package uses only assembly components matching the security configuration;
    a gateway including;
    a control service configured to install the data transmission application on the gateway,
    wherein the actions of the data transmission application are defined by the security configuration to block at least one inter-process interaction function of the data transmission application.

12. The system of claim 11, wherein the gateway further includes a microkernel OS configured to process all inter-process communication from a plurality of applications operating on the gateway.

13. The system of claim 12, wherein the plurality of applications includes the data transmission application and the actions of the data transmission application are defined using the microkernel OS.

14. The system of claim 13, wherein limits of the actions of the data transmission application are determined by the security configuration and considered when installing the data transmission application on the gateway.

15. The system of claim 11, wherein the control tool further comprises instructions that, when executed on the control tool computing platform, cause the control tool computing platform to collect the architecture data of the AS, wherein the architecture data includes at least one of:
   a list of AS devices;
   a topology of the AS;
   a list of applications installed on the gateway;
   a list of known vulnerabilities for each application installed on the gateway; and
   a list of data exchange protocols operable with each application installed on the gateway and known vulnerabilities of the data exchange protocols.

16. The system of claim 11, wherein the instructions that, when executed on the control tool computing platform, cause the control tool computing platform to build a security configuration based on the architecture data include at least one of:
   preventing a function call when the function is accessed through a pointer;
   preventing a function call to load executable code into the address space of the function;
   preventing a function call for an AS device control function; and
   preventing transmission of data for a protocol that does not match a preassigned signature.

17. The system of claim 11, wherein the actions of the data transmission application are defined by the security configuration by at least one of:
   prohibiting use of an unsafe data structure;
   prohibiting use of an unsafe API function;
   prohibiting execution of known vulnerable code;
   prohibiting a violation of a preassigned security policy;
   prohibiting access of an AS device application to data;
   prohibiting a function call having a function signature with function parameters outside of function parameters defined by known signatures; and
   prohibiting a function call based on a list of prohibited functions.

18. The system of claim 11, wherein the data transmission application is configured to interact with a cloud data service.

19. The system of claim 18, wherein the security configuration allows data to be transmitted from the data transmission application to a cloud data service and prevents at least one command to at least one AS device from outside the AS network.

20. A system for protecting an automated system (AS), the AS including a plurality of AS devices, the system comprising:
   means for building a security configuration based on architecture data of the AS, wherein compliance with the security configuration ensures a security level for the plurality of AS devices;
   means for building a package for installation of a data transmission application, wherein the data transmission application is configured to exchange data with at least one computing device outside the AS network, and wherein the package uses only assembly components matching the security configuration;
   means for installing the data transmission application on a gateway of an AS network; and
   means for transmitting data from one of the plurality of AS devices through the data transmission application, wherein the actions of the data transmission application are defined by the security configuration to block at least one inter-process interaction function of the data transmission application.

* * * * *